(12) United States Patent
Chen et al.

(10) Patent No.: US 7,441,836 B2
(45) Date of Patent: Oct. 28, 2008

(54) BICYCLE SADDLE AND MEANS FOR MOUNTING THE SADDLE ON A BICYCLE SEAT POST

(76) Inventors: Jia-Pin Chen, No. 51, Hengzun St., Dajia Township, Taichung County 437 (TW); Kuo-Chin Chao, No 51, Hengzun St., Dajia Township, Taichung County 437 (TW)

( * ) Notice: Subject to any disclaimer, the term of this patent is extended or adjusted under 35 U.S.C. 154(b) by 0 days.

(21) Appl. No.: 11/542,571

(22) Filed: Oct. 4, 2006

(65) Prior Publication Data

US 2007/0210624 A1  Sep. 13, 2007

(30) Foreign Application Priority Data

Mar. 8, 2006   (TW) ............................... 95203867 U
Aug. 11, 2006  (TW) ............................... 95129647 A

(51) Int. Cl.
   *B62J 1/00*  (2006.01)
(52) U.S. Cl. .................................... 297/202; 297/195.1
(58) Field of Classification Search .............. 297/202, 297/201, 195.1, 204, 206; 280/226.1
   See application file for complete search history.

(56) References Cited

U.S. PATENT DOCUMENTS

| | | | | |
|---|---|---|---|---|
| 556,250 A * | 3/1896 | Brown | ......................... | 297/202 |
| 570,497 A * | 11/1896 | Pattisson | ..................... | 297/201 |
| 617,140 A * | 1/1899 | Beck | ........................... | 297/202 |
| 749,865 A * | 1/1904 | Jarvis | ..................... | 297/188.09 |
| 1,216,273 A * | 2/1917 | Brigel | ......................... | 297/202 |
| 1,858,477 A * | 5/1932 | Blake | ......................... | 297/202 |
| 2,931,423 A * | 4/1960 | Kalter | .................... | 297/215.15 |
| 3,066,978 A * | 12/1962 | Kalter | .................... | 297/215.15 |
| 3,682,509 A * | 8/1972 | Worley | ..................... | 297/195.1 |
| 4,568,121 A * | 2/1986 | Kashima | ................ | 297/215.15 |
| 4,898,422 A * | 2/1990 | West, III | ..................... | 297/202 |
| 5,020,851 A * | 6/1991 | Chen | ......................... | 297/195.1 |
| 5,330,283 A * | 7/1994 | Ballard | ......................... | 403/97 |
| 5,362,127 A * | 11/1994 | Chang | ..................... | 297/195.1 |
| 5,387,024 A * | 2/1995 | Bigolin | ..................... | 297/202 |
| 5,664,829 A * | 9/1997 | Thomson et al. | ....... | 297/215.14 |
| 5,979,978 A * | 11/1999 | Olsen et al. | ............. | 297/215.15 |
| 6,254,180 B1 * | 7/2001 | Nelson | ......................... | 297/201 |
| 6,371,554 B1 * | 4/2002 | Ko | ............................... | 297/201 |
| 6,561,578 B1 | 5/2003 | Mei | | |
| 6,702,376 B1 * | 3/2004 | Shen | ..................... | 297/215.15 |
| 7,080,879 B2 * | 7/2006 | Barnett | ................... | 297/215.14 |
| 7,125,072 B2 * | 10/2006 | Bugle et al. | ............... | 297/195.1 |

* cited by examiner

*Primary Examiner*—David R Dunn
*Assistant Examiner*—Tania Abraham
(74) *Attorney, Agent, or Firm*—Browdy and Neimark, P.L.L.C.

(57) ABSTRACT

A bicycle saddle and means for mounting the saddle body on a bicycle seat post. The bicycle saddle comprises a saddle body including a wide rear portion, a narrow front portion, a middle portion and a hollowed mounting portion extending downwardly from the underneath side of the saddle body. The mounting means includes upper and under devices to cooperate with the saddle body in such a way that a part of the mounting portion of the saddle body can be sandwiched between the upper and under devices to mount the saddle body on a bicycle seat post.

16 Claims, 22 Drawing Sheets

BICYCLE SADDLE AND MEANS FOR MOUNTING THE SADDLE ON A BICYCLE SEAT POST

BACKGROUND OF THE INVENTION

1. Field of the Invention

The present invention relates generally to a bicycle saddle with a light-weight yet hardy construction, and means for easily mounting the bicycle saddle on a bicycle seat post.

2. Description of the Related Art

In general, all prior art bicycle saddles utilize a pair of parallel support rails running longitudinally of the saddle and spaced from its underside to attach to the bicycle seat post. The rails are typically made of metal such as aluminum, steel, titanium, or the like and engaged and held in place by appropriate mounting hardware associated with the bicycle seat post.

A disadvantage of the prior art saddles is that the rails tend to bend in use, so that the seat eventually goes out of alignment. Also, the attachment brackets for the rails interfere with the aerodynamic flow of air under the saddle. In addition, for utilizing the rails and the attachment brackets, the weight of the prior art bicycle saddles can not be effectively reduced.

U.S. Pat. No. 6,561,578 disclosed a new mounting system for bicycle saddles to avoid the drawbacks described above. The mounting system has a T-beam rail that protrudes perpendicularly from the underside of a saddle and a guide formed by a pair of channel plates that are secured on a bicycle seat post and clamp the rail therebetween so that the saddle can be mounted on the seat post. Such a mounting system can eliminate the disadvantages of the prior art saddles for no support rails of prior art saddles. However, it still produces some disadvantages. One of the disadvantages is that the connecting area between the saddle and the T-beam rail cracked easily due to stresses formed therein. Another disadvantage is that the mounting system can not cooperate with prior art seat posts.

SUMMARY OF THE INVENTION

It is the primary objective of the present invention to provide a light-weight yet hardy bicycle saddle with no prior art support rails and means for easily mounting the saddle on bicycle seat posts.

It is a further objective of the present invention to provide a bicycle saddle with ventilation function for dissipating heat generated in the rider's perineal areas.

In carrying out the foregoing objectives, a bicycle saddle in accordance with the present invention comprises a saddle body including a wide rear portion, a narrow front portion, a middle portion positioned between the wide rear portion and the narrow front portion. The saddle body further includes a hollowed mounting portion extending downwardly from the underneath side of the saddle body.

In one of the preferred embodiment of the bicycle saddle, the hollowed mounting portion of the saddle body has a depression being U-shaped in transverse cross section and extending along the center axis of said saddle body. The depression can be designed to have two side walls separated by a predetermined distance and a bottom wall at the foot ends of the side walls.

The present invention further provides means for cooperating with the mounting portion of the saddle body and appropriate prior art mounting hardware associated with a bicycle seat post to easily mount the saddle body on a bicycle seat post.

A preferred embodiment of means mentioned above includes upper and under devices to cooperate with the mounting portion of the saddle body in such a way that a part of the mounting of the saddle body is sandwiched by the upper and under devices to easily mount the saddle body on a seat post.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention may be more clearly understood with reference to the following detailed description, in conjunction with the appended drawings of which.

DETAILED DESCRIPTION OF THE INVENTION

Figure 1:
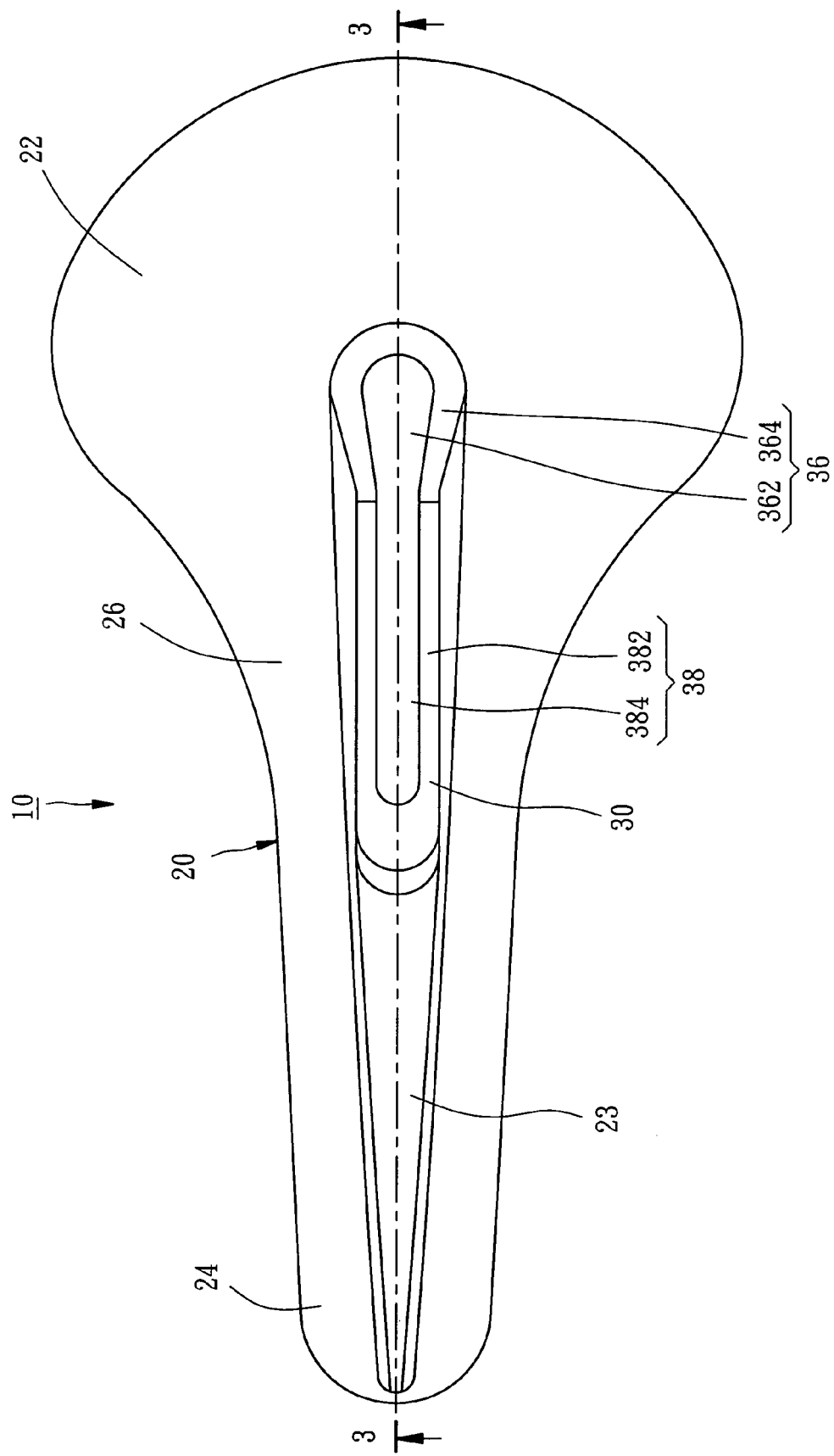
FIG. 1 is a top view of a first preferred embodiment of a saddle body according to the present invention.
Figure 2:
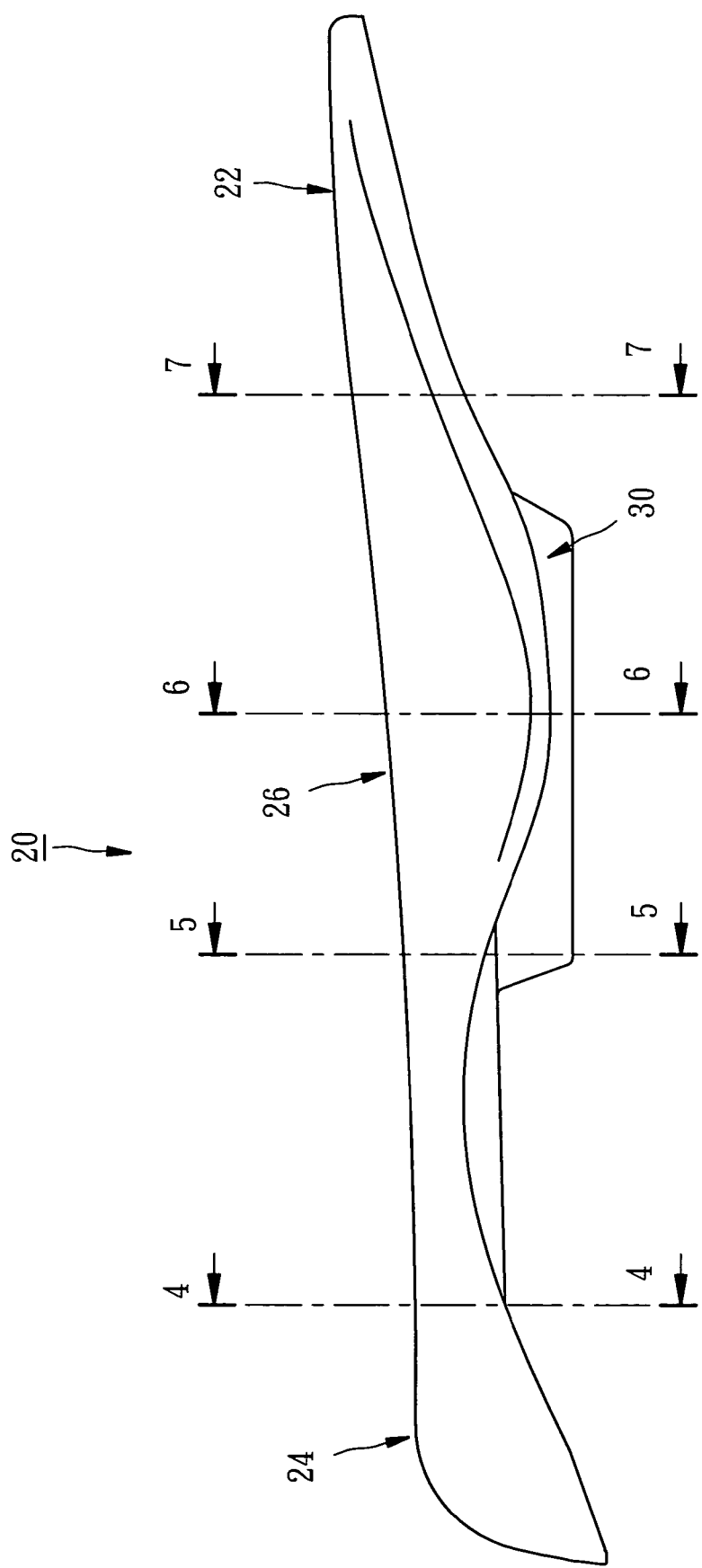
FIG. 2 is a side view of the embodiment shown in FIG. 1.
Figure 3:
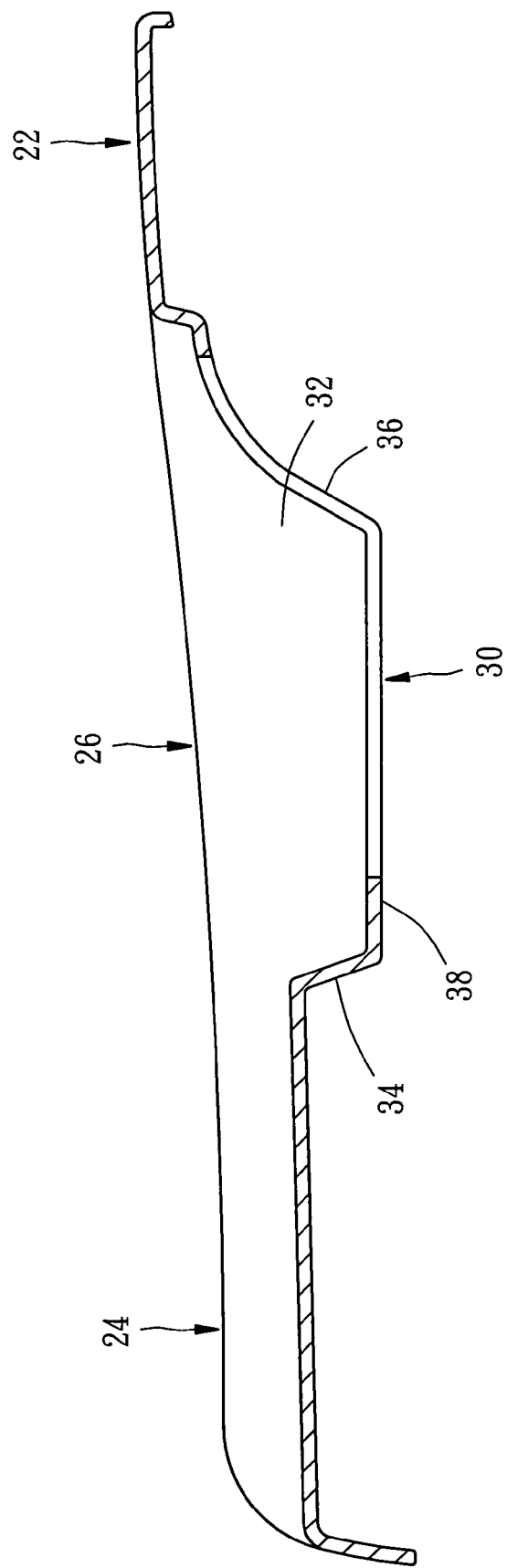
FIG. 3 is a cross-sectional view taken along the line 3-3 of FIG. 1.
Figure 4:
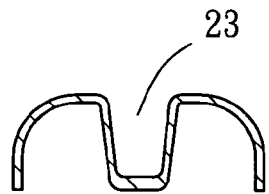
FIG. 4 is a cross-sectional view taken along the line 4-4 of FIG. 2.
Figure 5:
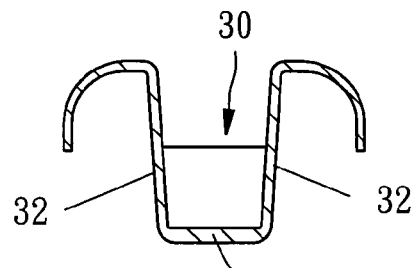
FIG. 5 is a cross-sectional view taken along the line 5-5 of FIG. 2.
Figure 6:
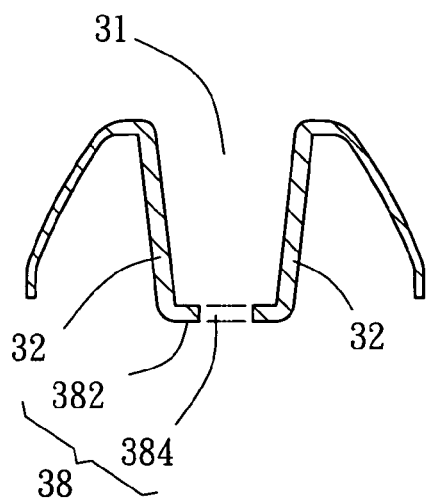
FIG. 6 is a cross-sectional view taken along the line 6-6 of FIG. 2.
Figure 7:
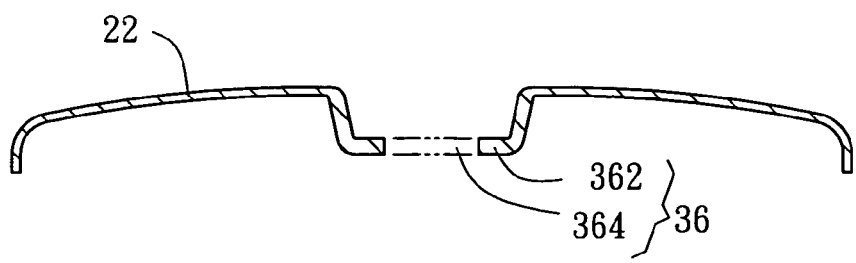
FIG. 7 is a cross-sectional view taken along the line 7-7 of FIG. 2.
Figure 8:
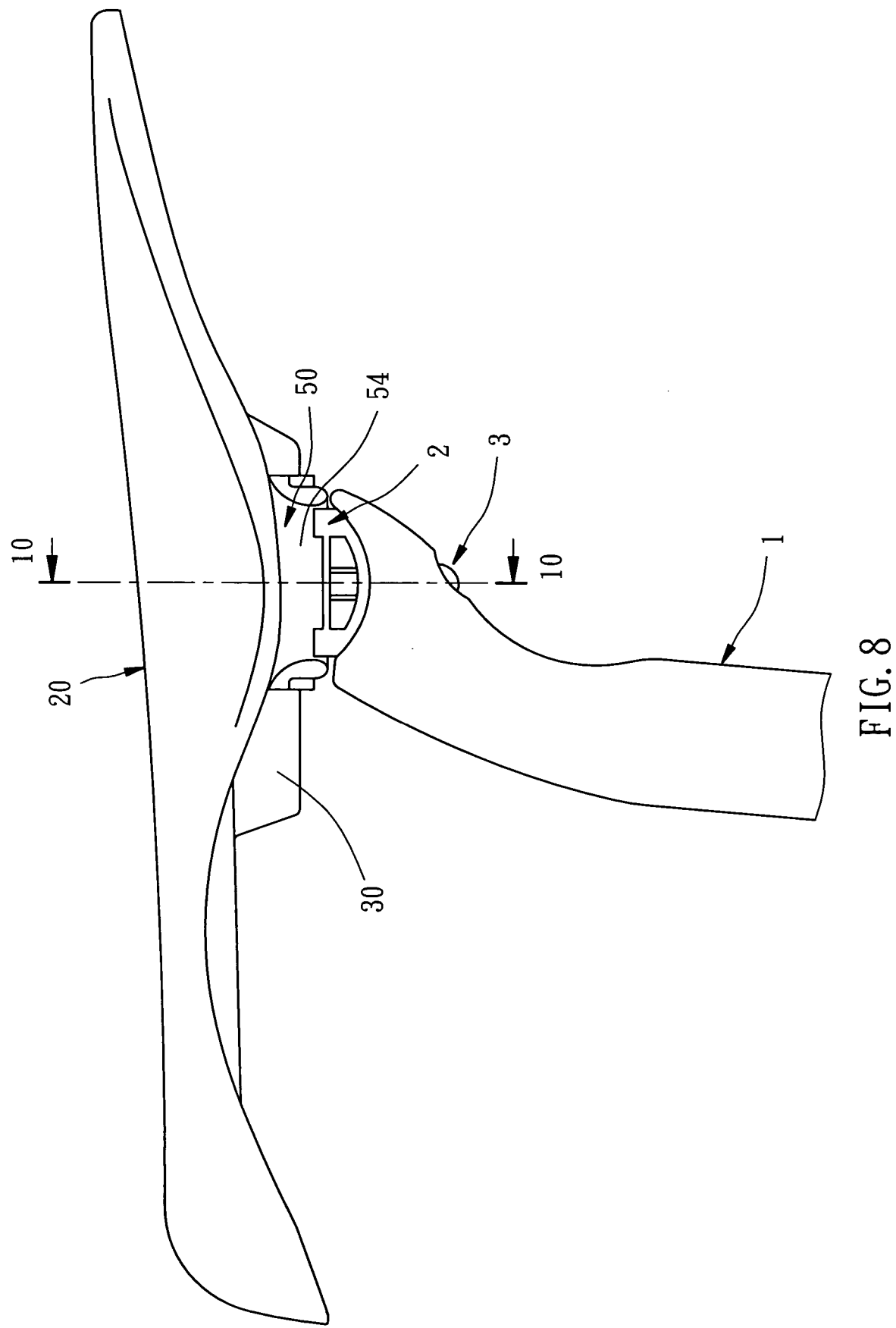
FIG. 8 is a side view a first preferred embodiment of a mounting means according to the present invention clearly showing that the saddle body shown in FIG. 1 is mounted on a seat post by the mounting means.
Figure 9:
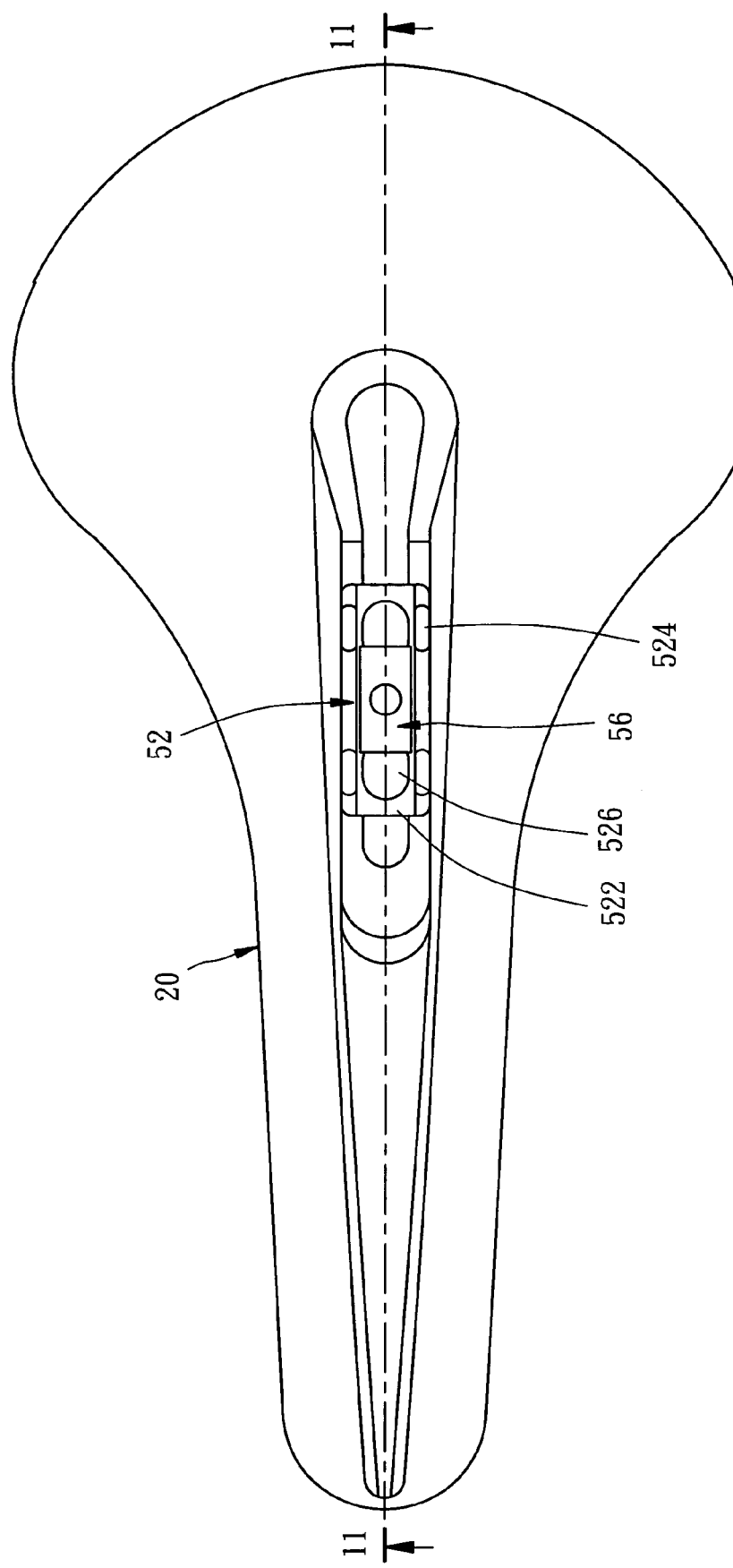
FIG. 9 is a top view of a first preferred embodiment of a mounting means according to the present invention clearly showing that the saddle body shown in FIG. 1 is mounted on a seat post by the mounting means.
Figure 10:
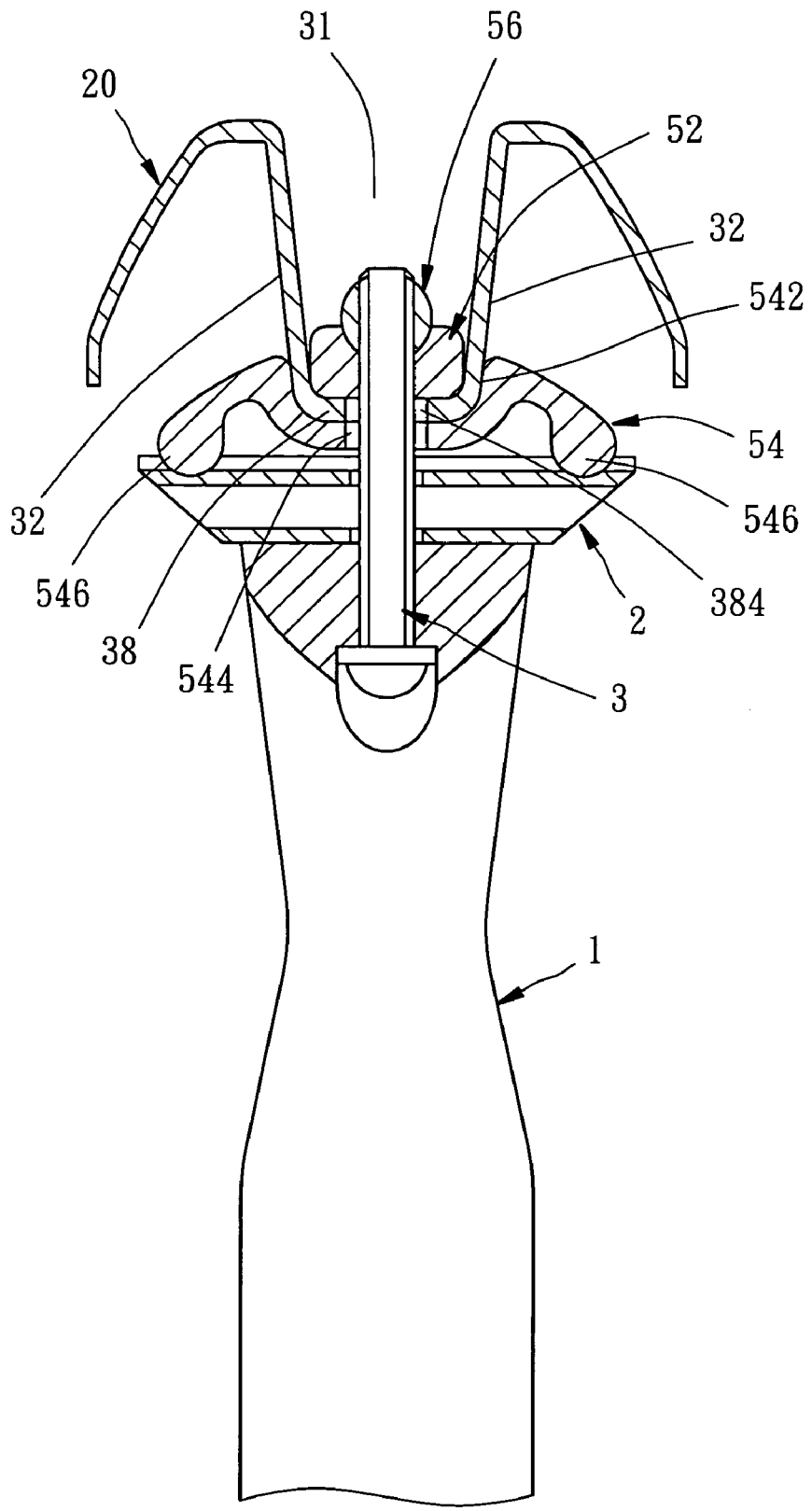
FIG. 10 is a cross-sectional view taken along the line 10-10 of FIG. 8.

Referring firstly to FIGS. 1 to 7, there is illustrated a first embodiment of a bicycle saddle of the present invention, generally designated 10. Bicycle saddle 10 includes a saddle body 20 which is made of particularly rigidity and light materials such as, for example, strengthened plastics, fiber-reinforced plastics or alloys. Saddle body 20 has a wide rear portion 22, a narrow front portion 24, a middle portion 26 positioned between wide rear portion 22 and a narrow front portion 24, and a hollowed mounting portion 30 extending downwardly from the underneath side of saddle body 20. The upper side of saddle body 20 provides a ventilation channel 23 extending along the center axis of saddle body 20.

Mounting portion 30, in this embodiment, is a U-shaped depression in transverse cross section. Describing detailedly, mounting portion 30 has an rectangle upper opening 31 located on the upper side of saddle body 20, two side walls 32 extending respectively and downwardly from each long side of upper opening 31, a front wall 34 located near narrow front portion 24, a rear wall 36 located near wide rear portion 22 and a bottom wall 38.

Rear wall 36 extends downwardly and forwardly from a short side of upper opening 31 to connect with bottom wall 38 and includes a rear opening 362 and an upper reinforced edge 364.

Bottom wall 38 has an under edge 382 and a center cut 384 with an open side. Rear opening 362 of rear wall 36 extends downwardly to connect with the open side of center cut 384 of bottom wall 38. Rear opening 362 of rear wall 36 is used not only to cooperate with ventilation channel 23 to perform ventilation function but also to form a resilient buffer such as, for example, each of side walls 32 can have a rear side with a cove so that each of side walls 32 serves as a resilient buffer to absorb the vibrations as riding.

Referring secondly to FIGS. 8 to 13, mounting means embodied according to the present invention to mount saddle body 20 on a bicycle seat post is designated 50. Mounting means 50 includes an upper device 52, an under device 54 and at least a fixing device 56.

Figure 11:
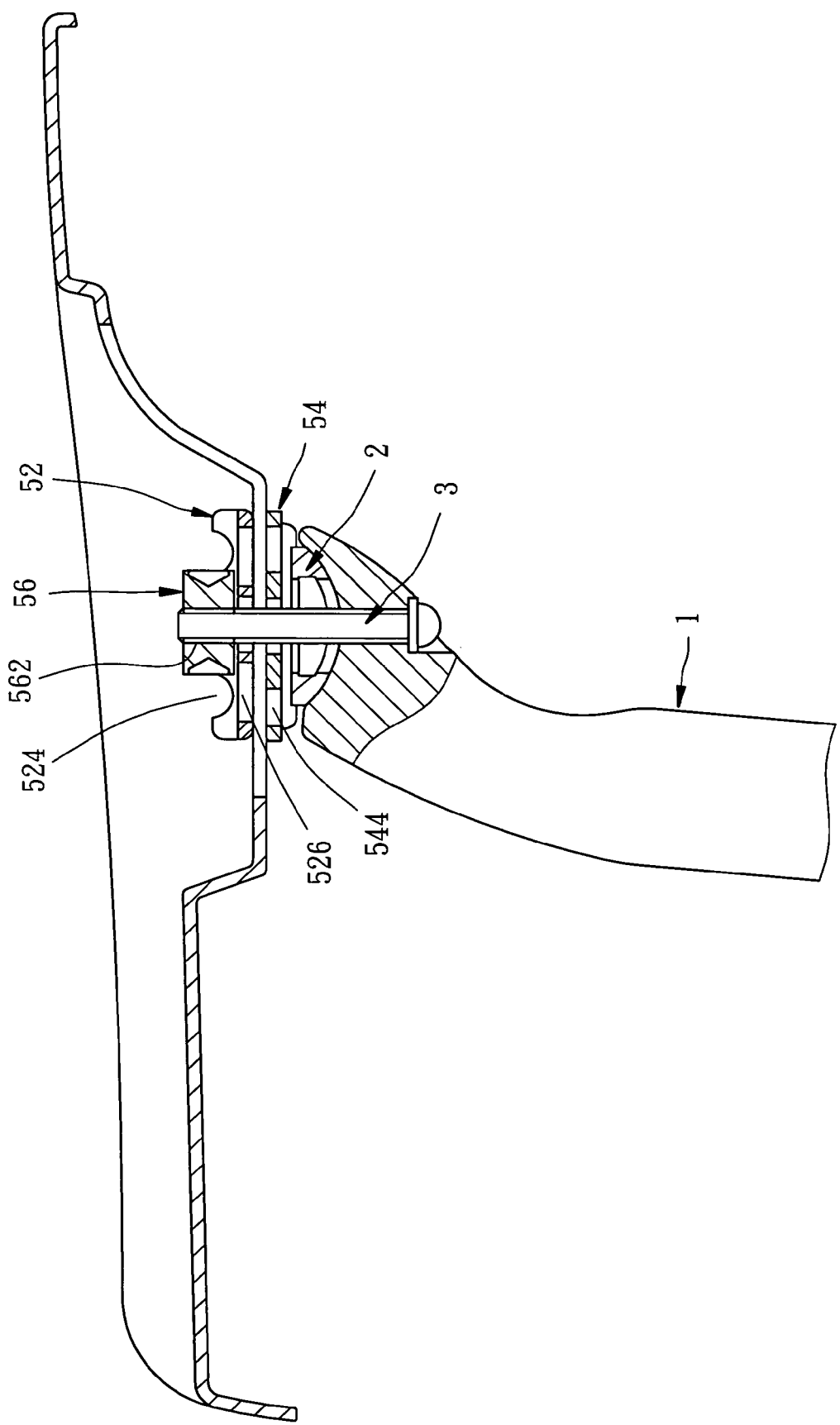
FIG. 11 is a cross-sectional view taken along the line 11-11 of FIG. 9.
Figure 13:
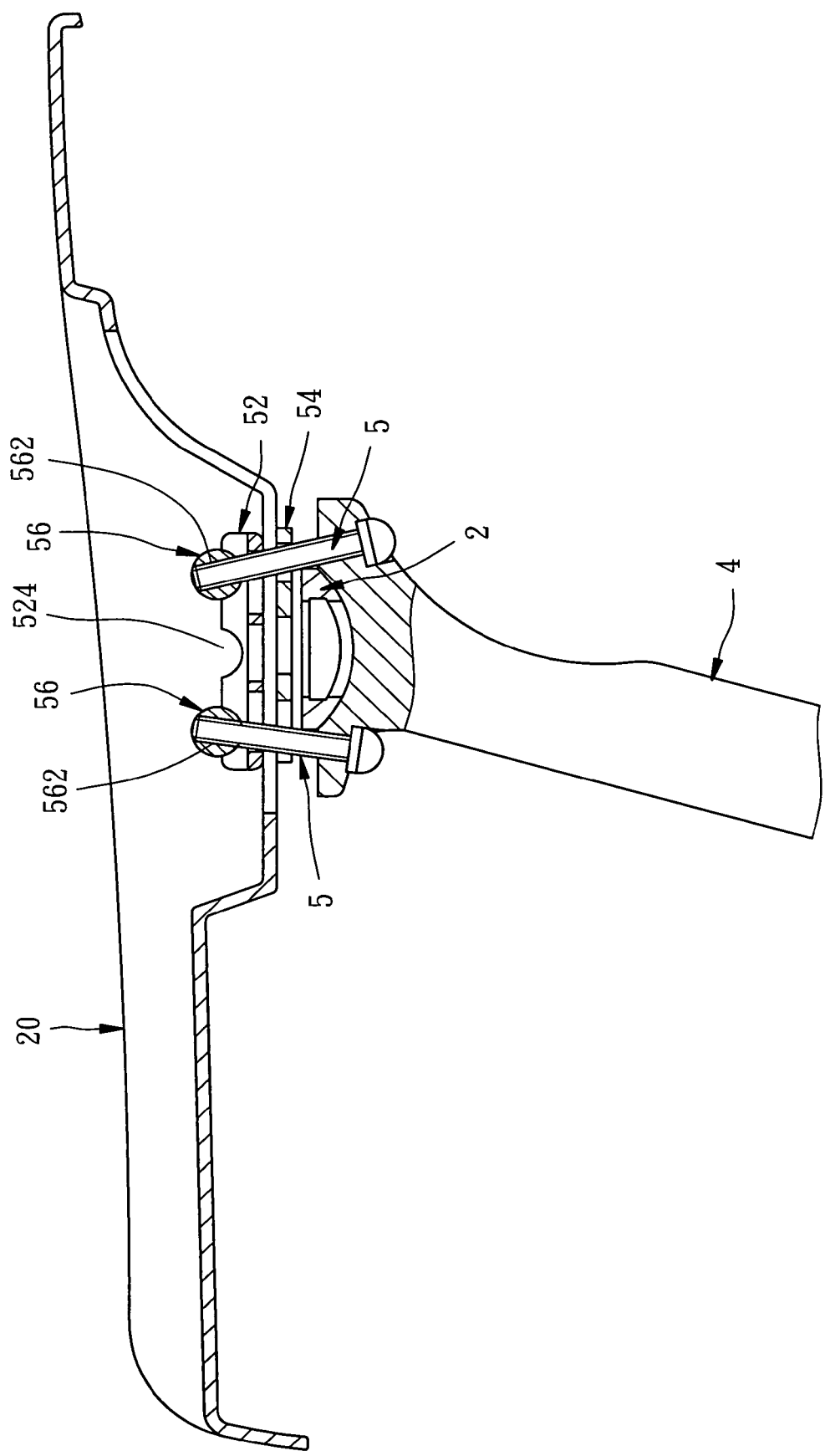
FIG. 13 is a cross-sectional view taken along the line 13-13 of FIG. 12.

Upper device 52 has a lump-shaped body with a lengthwise slot 522, three crosswise slots 524 and three holes 526. Fixing device 56 can be designed to have a long cylinder-shaped body with a threaded hole 562 to be received in lengthwise slot 522 of upper device 52 (as shown in FIG. 11), or a short cylinder-shaped body with a thread hole 562 to be received in one of crosswise slots 524 (as shown in FIG. 13).

Under device 54 has a plate-shaped body with a slot-like passage 542 provided on the upper surface thereof and three holes 544 respectively corresponding to each hole 526 of upper device 52, and two bended-down side 546.

Figure 12:
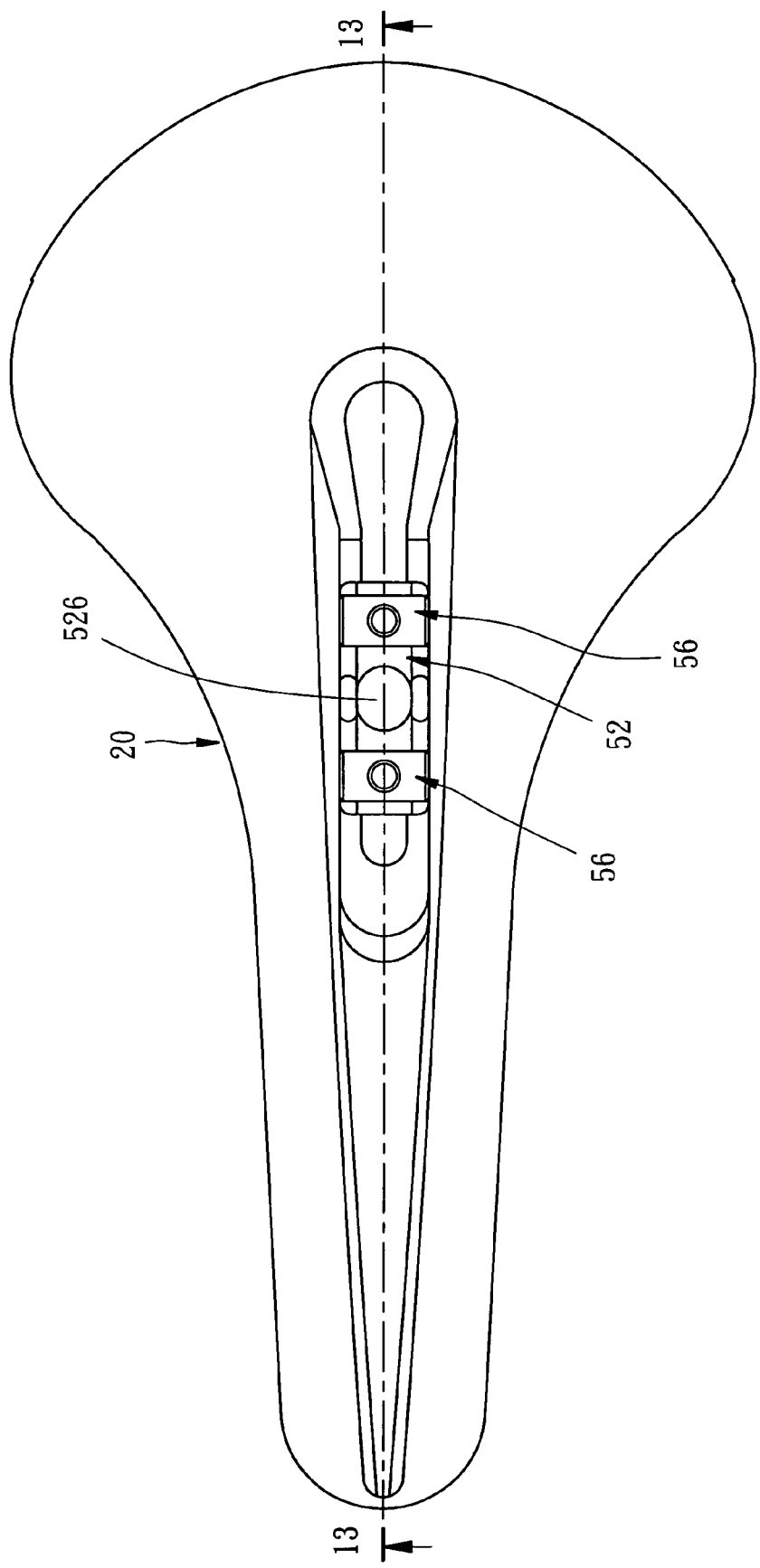
FIG. 12 is a top view of a second preferred embodiment of a mounting means according to the present invention more clearly showing that the saddle body shown in FIG. 1 is mounted on a seat post by the mounting means.

In mounting, upper device 52 is placed against the upper surface of bottom wall 38 of mounting portion 30 from upper opening 31 thereof. Under device 54 is placed against the lower surface of bottom wall 38 such that the bottom wall 38 is sandwiched by upper device 52 and under device 54, and in the same time, the end part of mounting portion 30 is received in passage 542 of under device 54 with each side 546 thereof fitted to a prior art hardware 2 secured on the top end of bicycle seat post 1. And then, screw 3 is inserted in sequence into a hole provided on seat post 1, hole 544 of under device 54, cut 384 of bottom wall 38 of mounting portion 30, hole 526 of upper device 52, and screwed onto threaded hole 562 of fixing device 56 so that saddle body 20 is mounted on bicycle seat post 1. As shown in FIGS. 12 and 13, in another embodiment, two screws 5 are used to screw all of members mentioned above together.

Figure 14:
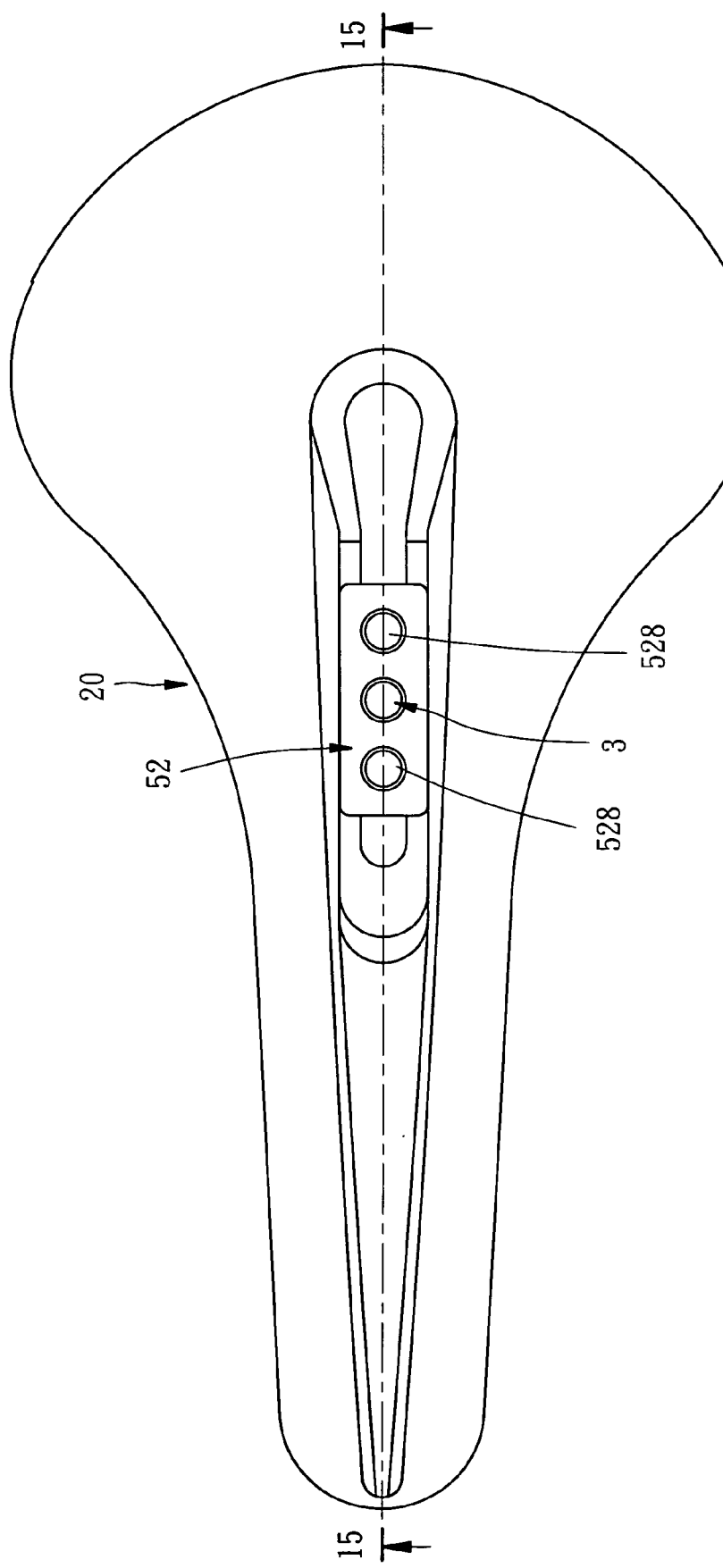
FIG. 14 is a top view of a third preferred embodiment of a mounting means according to the present invention more clearly showing that the saddle body shown in FIG. 1 is mounted on a seat post by the mounting means.
Figure 15:
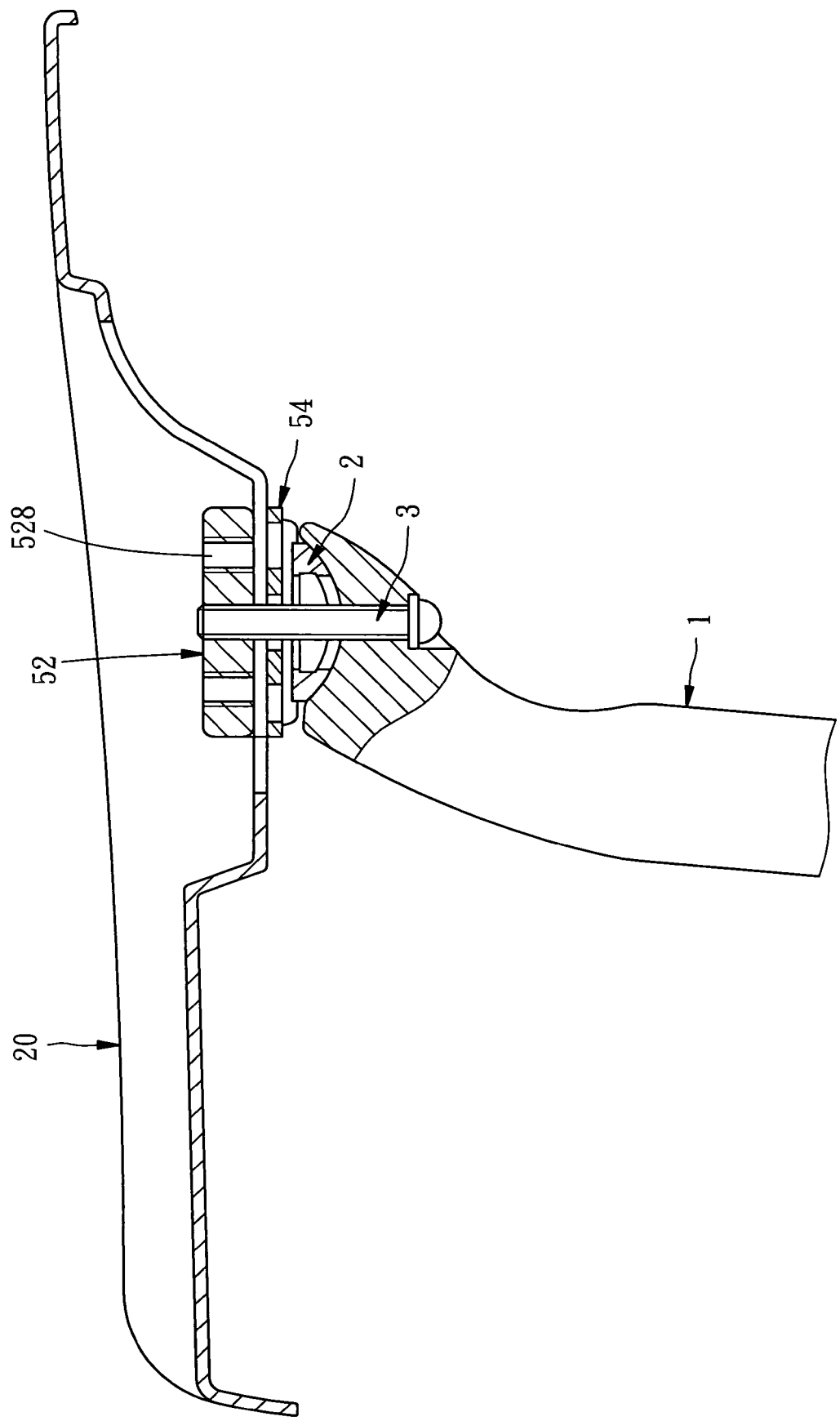
FIG. 15 is a cross-sectional view taken along the line 15-15 of FIG. 14.

Referring further to FIGS. 14 and 15, in another embodiment, upper device 52 of mounting means 50 is designed to have three threaded holes 528 so that screw 3 can directly screwed onto one of threaded holes 528 of upper device 52 without using fixing device 56.

Figure 16:
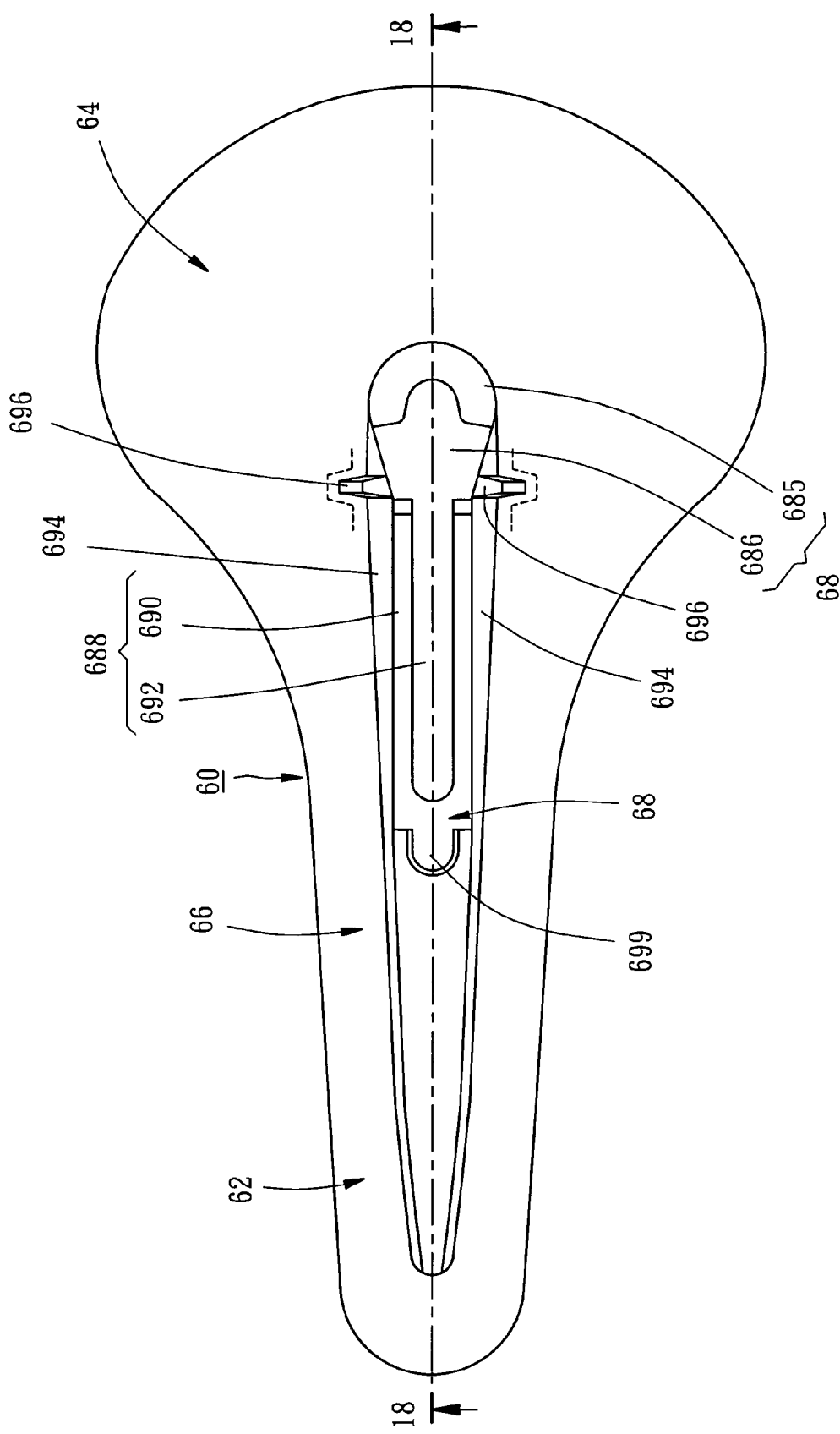
FIG. 16 is a top view of a second preferred embodiment of a saddle body according to the present invention.
Figure 17:
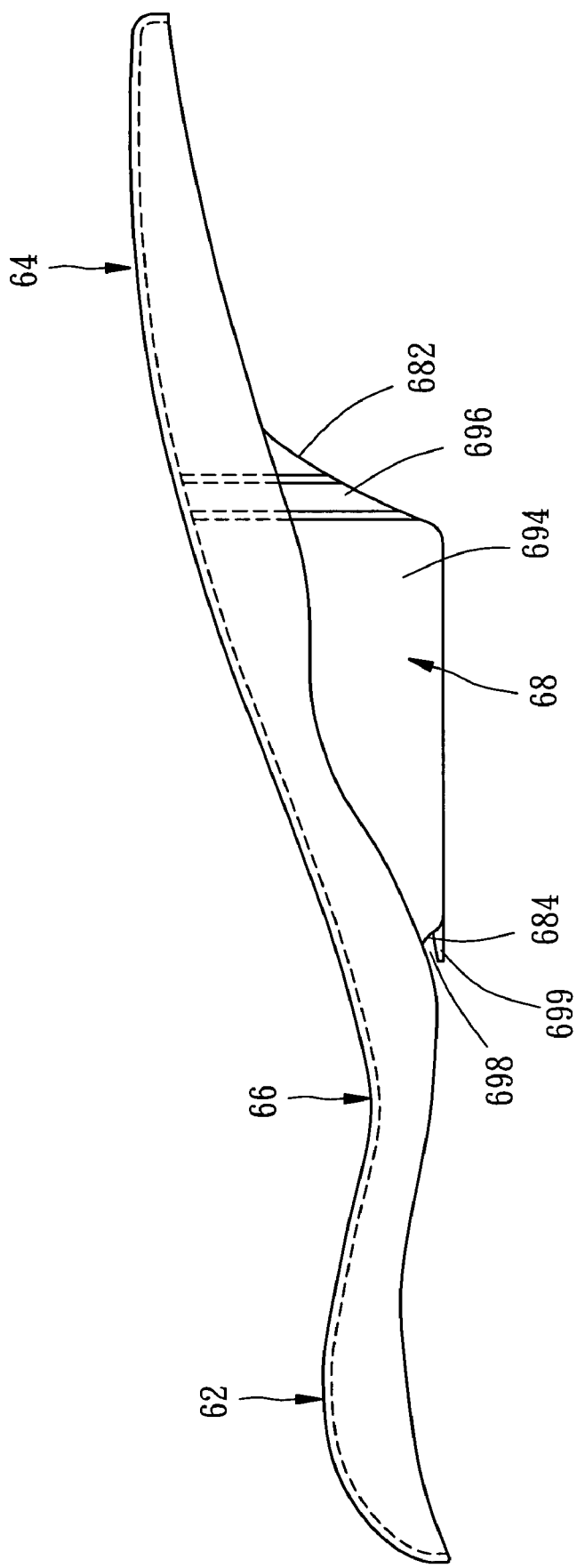
FIG. 17 is a side view of the embodiment shown in FIG. 16.
Figure 18:
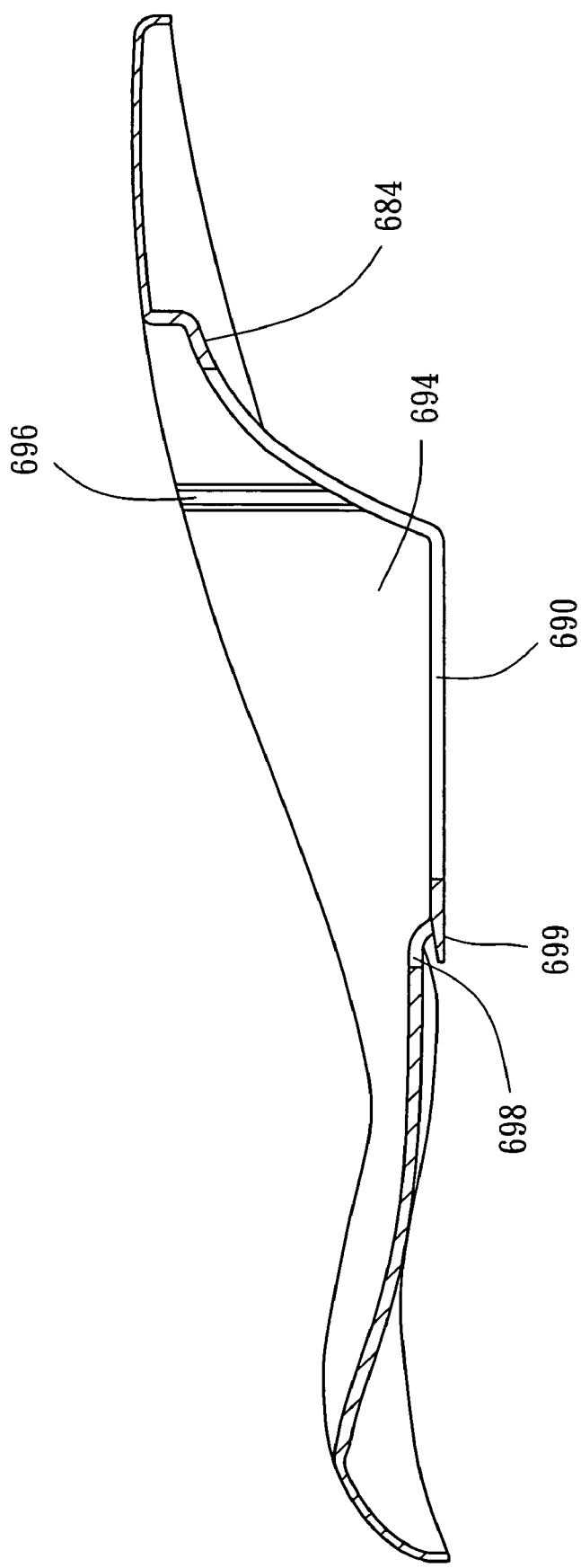
FIG. 18 is a cross-sectional view taken along the line 18-18 of FIG. 16.

Referring now to FIGS. 16 to 18, a second embodiment of a saddle body of the present invention is designated 60. Saddle body 60 includes a narrow front portion 62 which fits between bicycle rider's crotch, a wide rear portion 64 for supporting bicycle rider's buttocks, a concave middle portion 66 located therebetween and a hollowed mounting portion 68 extending downwardly from the underneath side of saddle body 60.

Wide rear portion 64 rises gradually from one end thereof which is connected with concave portion 66 to a free end of wide rear portion 64 so that an opening space with a sufficient depth above concave portion 66 is formed to arrange rider's genitals.

Mounting portion 68 is U-shaped in transverse cross section which includes a rear wall 682, a front wall 684 being shorter than rear wall 682, a bottom wall 688 and two side walls 694. Rear wall 682 has an upper edge 685 and a first opening 686. Bottom wall 688 has a bottom edge 690 and a long cut 692. Each of side walls 694 has a reinforced rib 696. Front wall 684 is designed to have a second opening 698 so that a tip 699 can be formed on the front end of bottom wall 688 to hang up a protecting cover.

Figure 19:
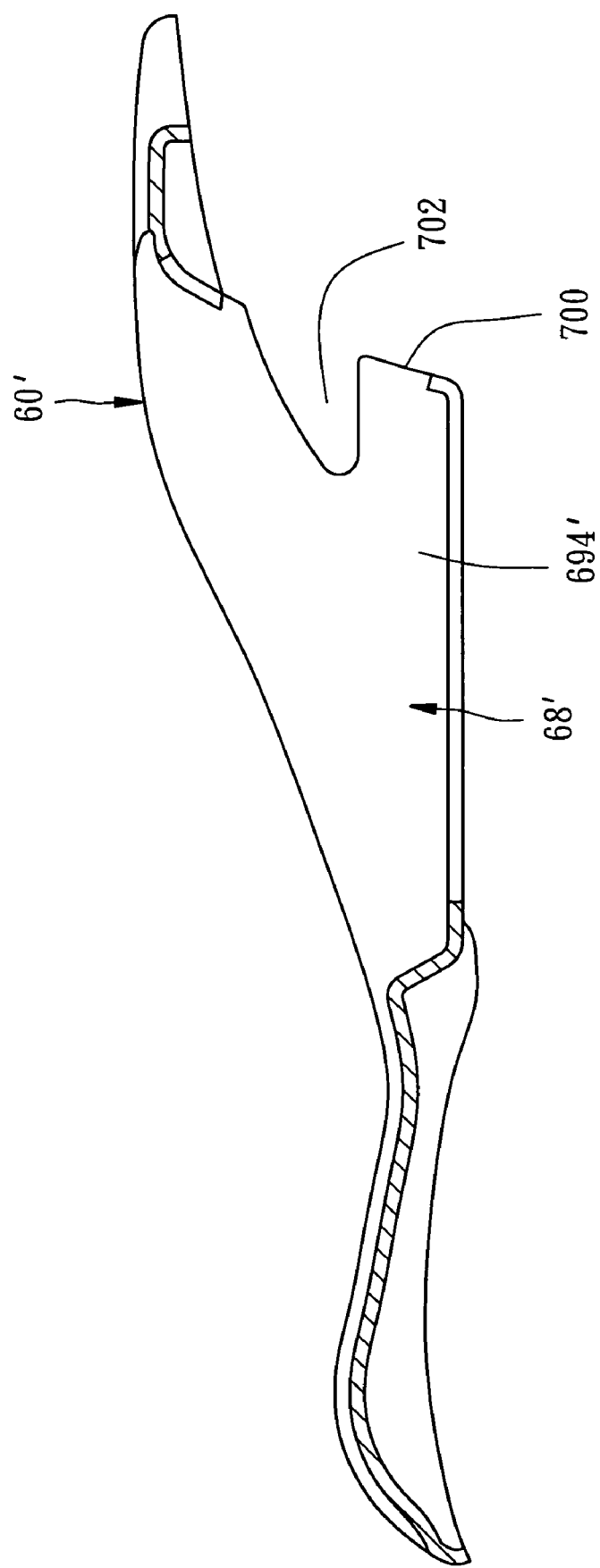
FIG. 19 is a side view of a third preferred embodiment of a saddle body according to the present invention.

In a third preferred embodiment of a saddle body 60' according to the present invention, each of side walls 694' of the mounting portion 68 of saddle body 60' has a rear side 700 with a cove 702 so that each of side walls 694' can serve as a resilient buffer to absorb the vibrations as riding (as shown in FIG. 19).

Figure 20:
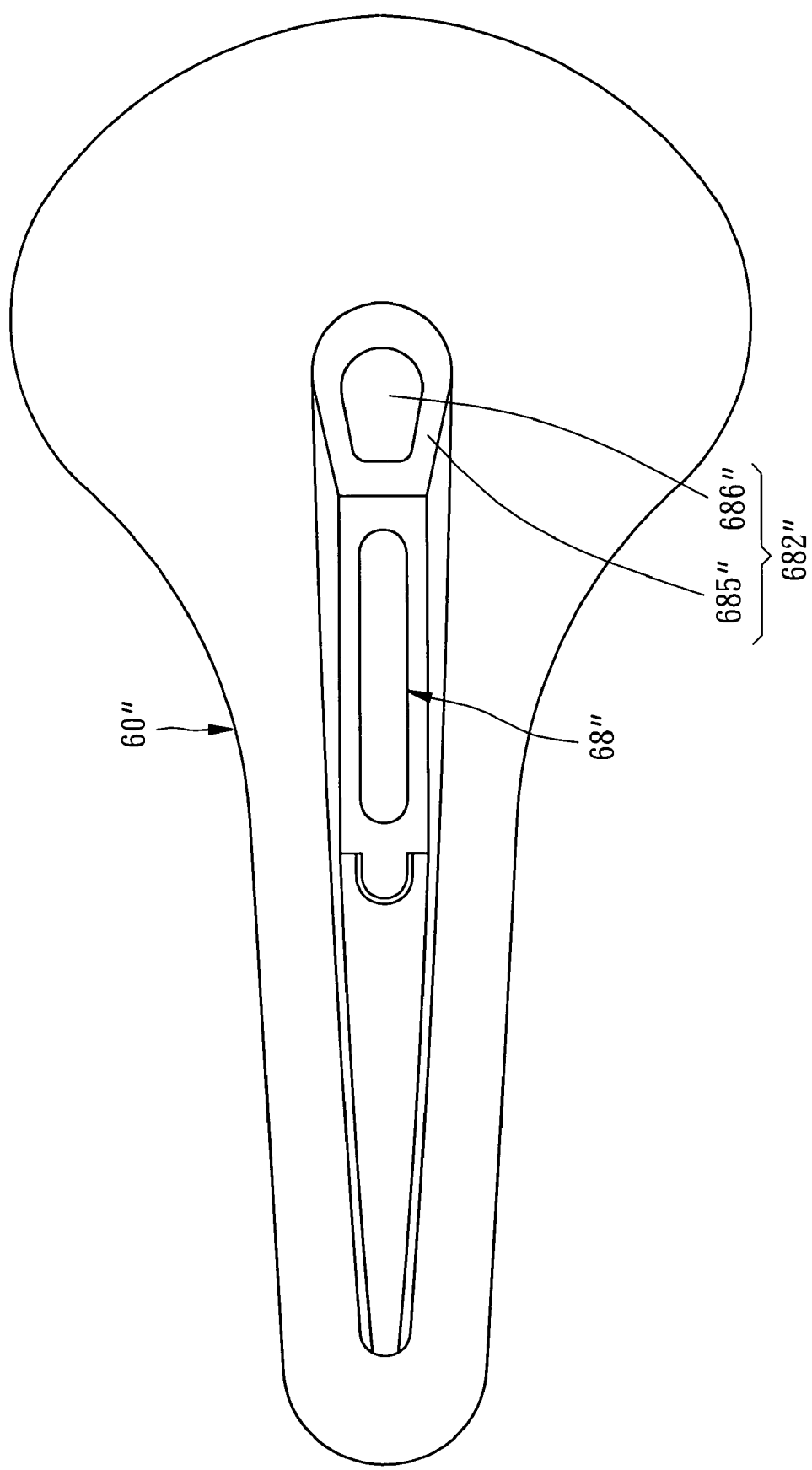
FIG. 20 is a top view of a fourth preferred embodiment of a saddle body according to the present invention.
Figure 21:
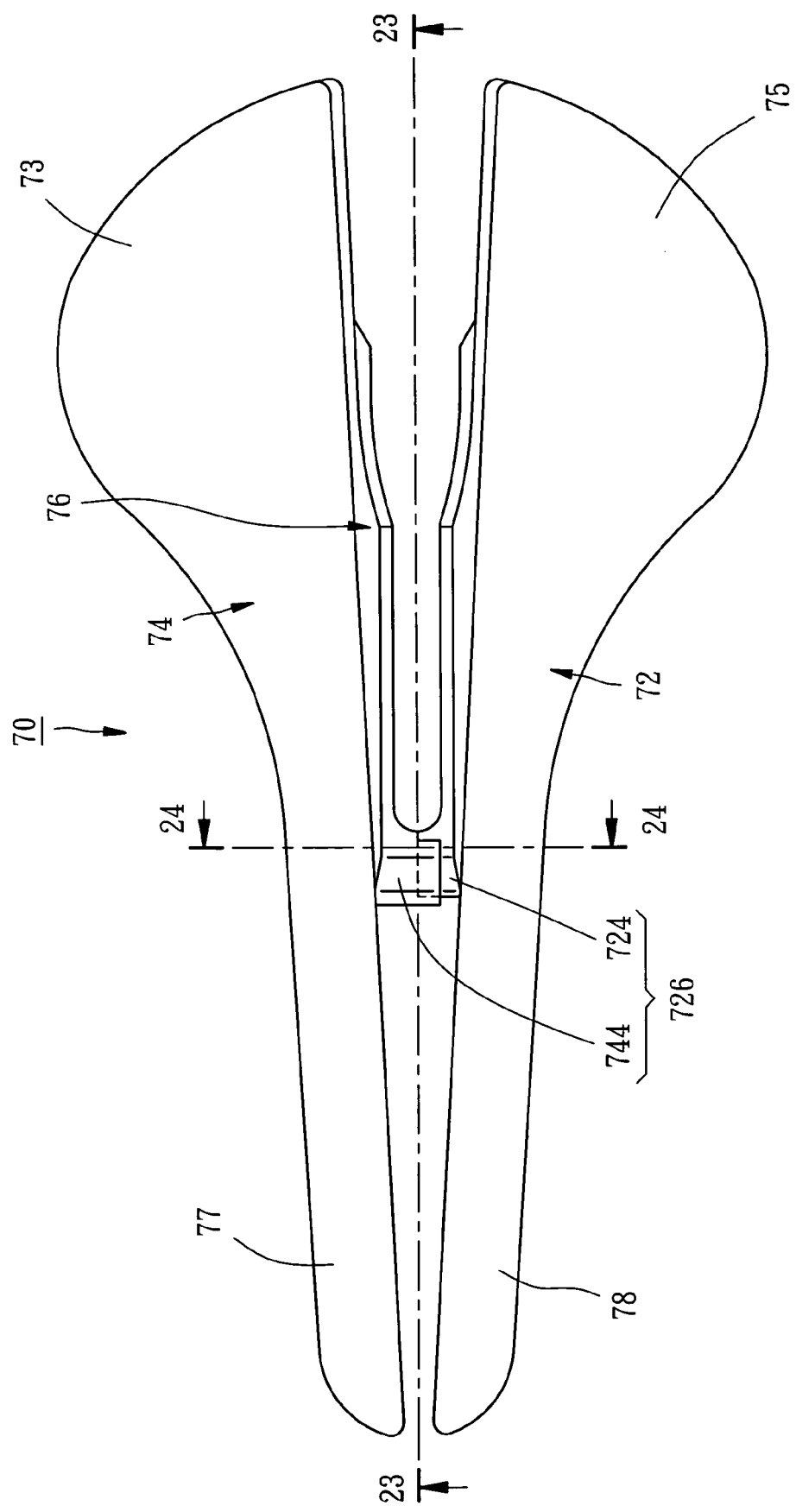
FIG. 21 is a top view of a fifth preferred embodiment of a saddle body according to the present invention.
Figure 22:
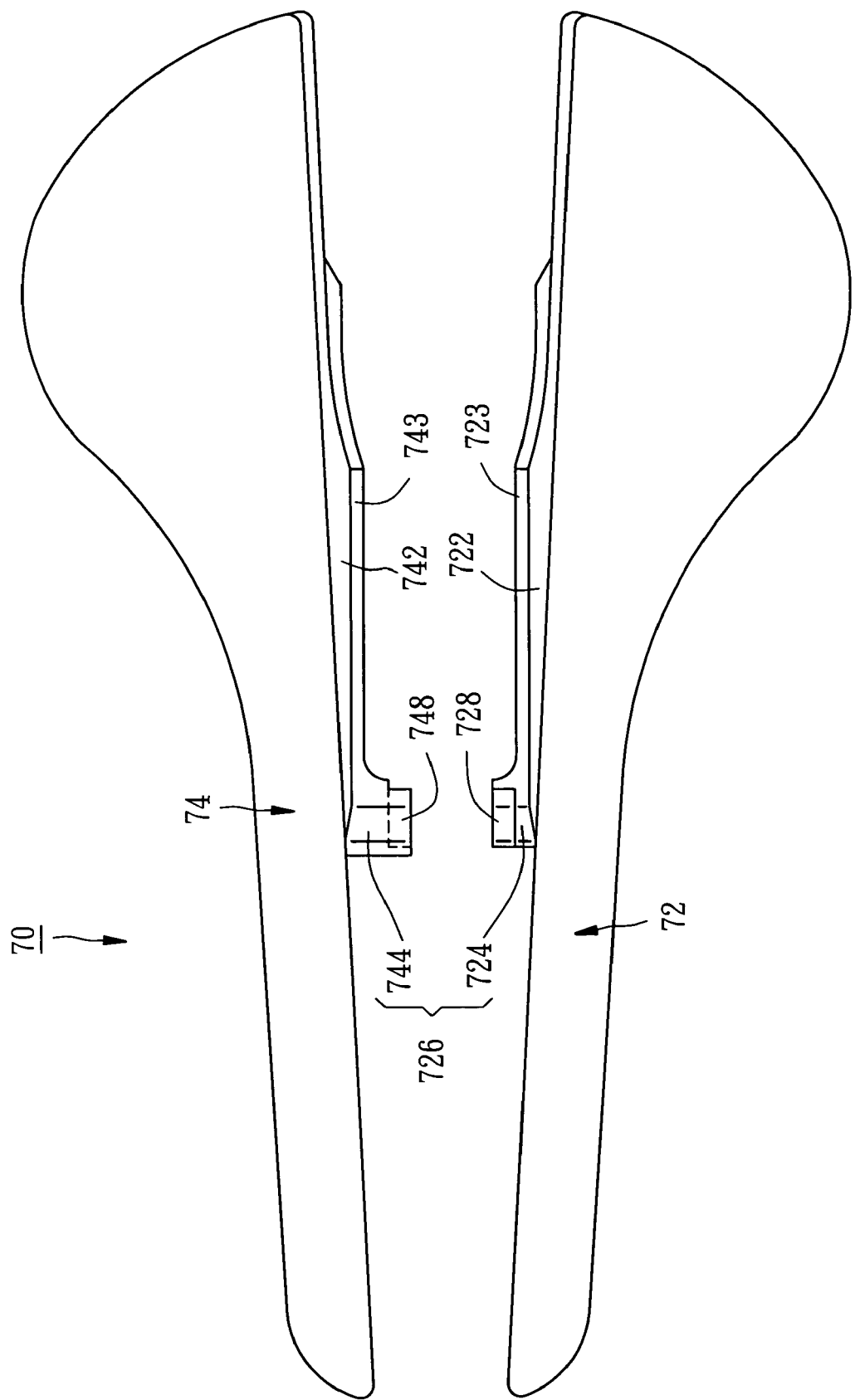
FIG. 22 is an exploded view of the embodiment shown in FIG. 21.
Figure 23:
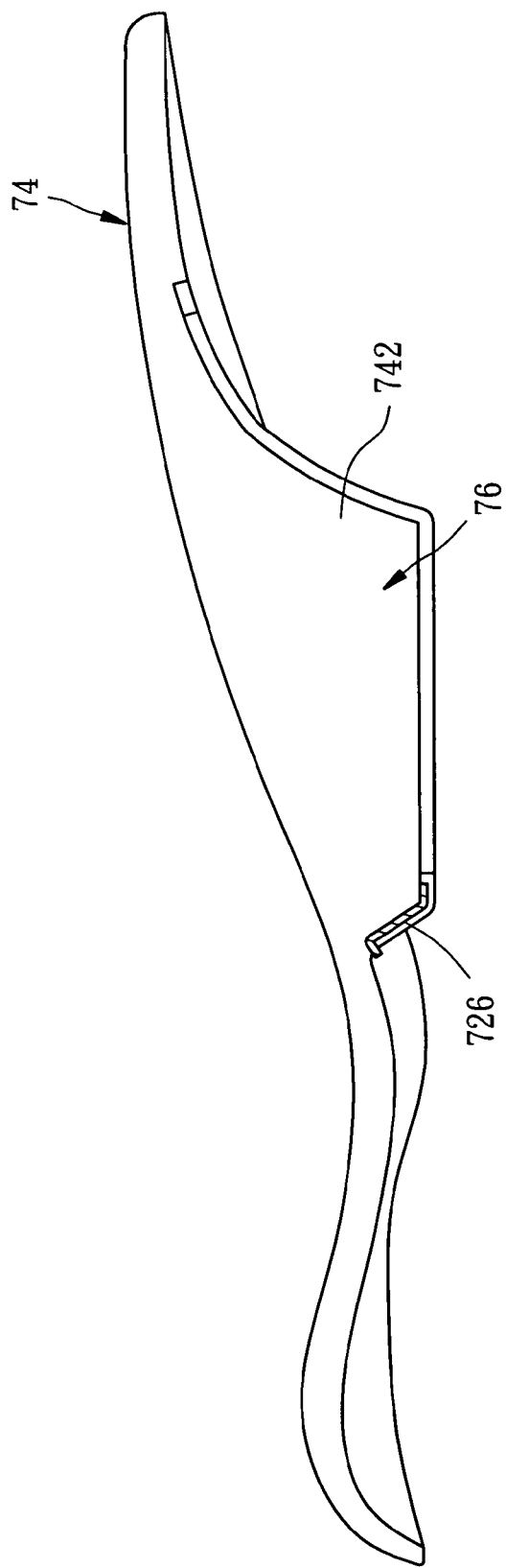
FIG. 23 is a cross-sectional view taken along the line 23-23 of FIG. 21.
Figure 24:
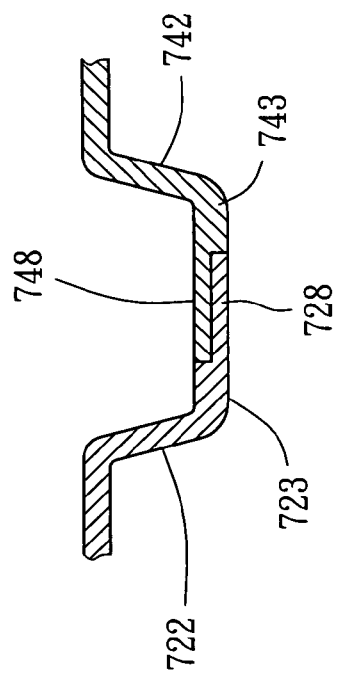
FIG. 24 is a cross-sectional view taken along the line 24-24 of FIG. 21.

In a fourth preferred embodiment of a saddle body 60" according to the present invention, rear wall 682" of mounting portion 68" has an opening 686" located on the center portion thereof rear wall 682" and an edge 685" surrounding opening 686" (as shown in FIG. 20).

Referring further to FIGS. 21 to 24, a fifth preferred embodiment of a saddle body of the present invention is designated 70. Saddle body 70 includes a pair of elongate frames 72, 74. Each of frames 72, 74 has respectively a wide rear portion 73, 75, a narrow front portion 77, 78, a side wall 722, 742, an under edge 723, 743, and a front wall 724, 744. When connecting together, frames 72, 74 forms saddle body 70 with a U-shaped mounting portion 76 having a front wall 726 to cooperate with mounting means provided by the present invention to mount saddle body 70 on a bicycle seat post. In this embodiment, each of front walls 722, 724 has a connecting edge 728, 748 formed complementally so that frames 72, 74 can be easily connected together.

Figure 25:
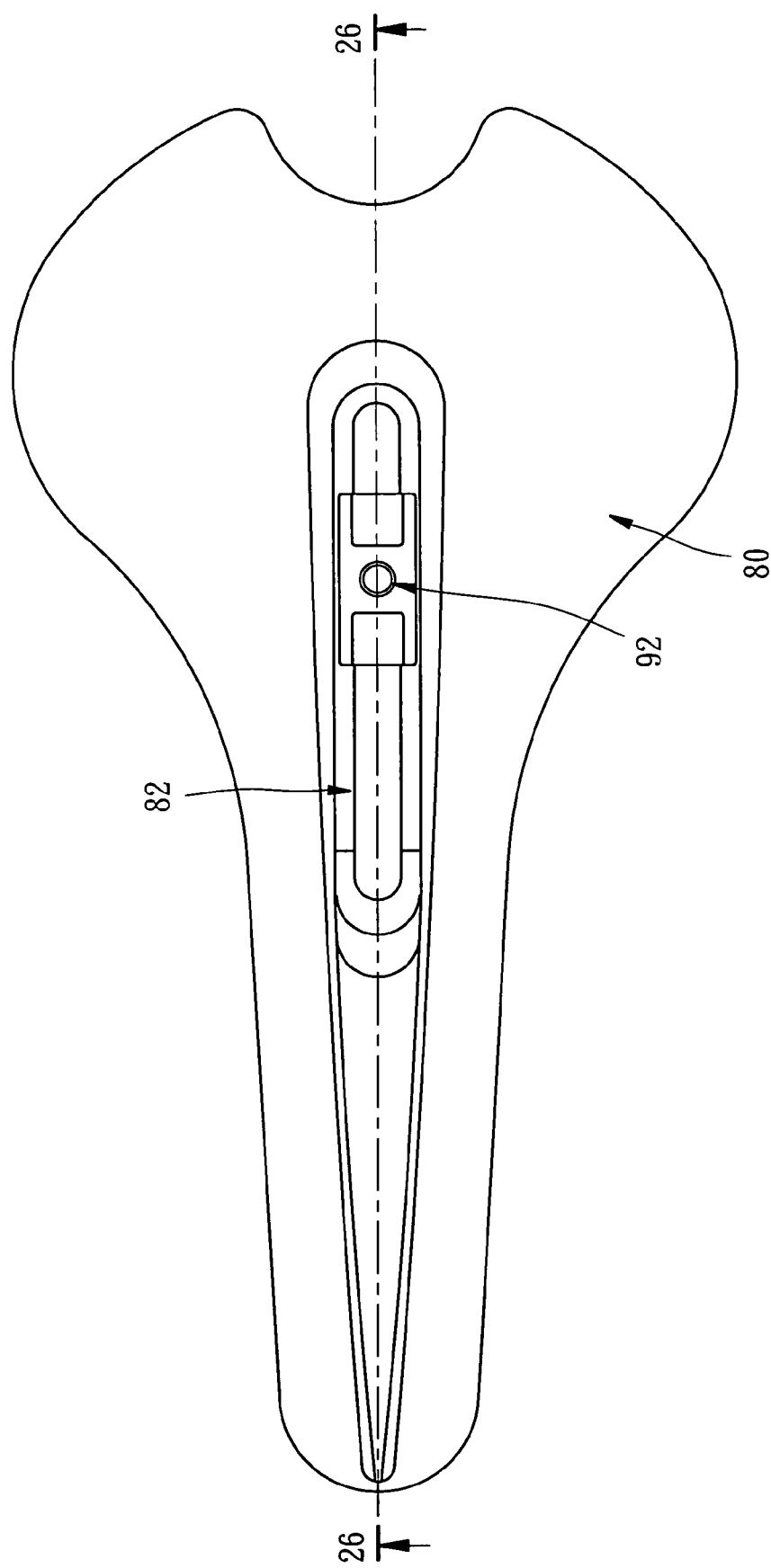
FIG. 25 is a top view of a sixth preferred embodiment of a saddle body according to the present invention mounted on a seat post by a fourth preferred embodiment of a mounting means according to the present invention.
Figure 26:
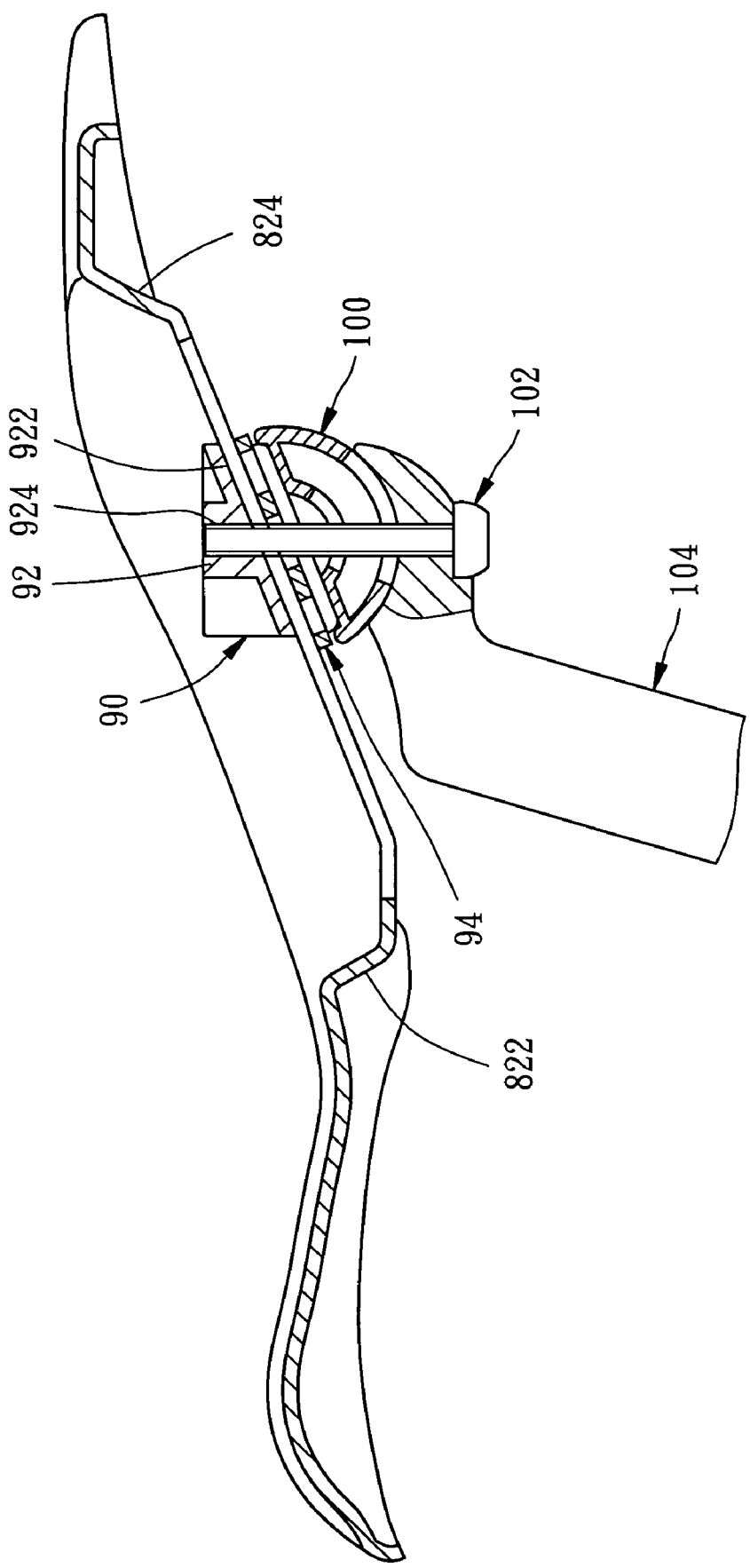
FIG. 26 is a cross-sectional view taken along the line 26-26 of FIG. 25.

Referring lastly to FIGS. 25 and 26, a sixth embodiment of a saddle body of the present invention is designated 80. Saddle body 80 includes a mounting portion 82 having a front wall 822 and a rear wall 824 with a height being equal to front wall 822. A mounting means 90 according to the present invention has an upper device 92 with an inclined bottom side 922 and a threaded hole 924, an under device 94 being similar to under device 54. In mounting, upper device 92 and under device 94 can cooperate with a prior art hardware 100 secured on a bicycle seat post 104 and a screw 102 to mount saddle body 80 on seat post 104 in an inclined way.

As mentioned above, the bicycle saddle provided by the present invention is designed to have a U-shaped mounting portion to substitute for prior art support rails so that the weight of saddles can be significantly decreased, and the process to mount the saddle on a seat post is also simplified. The mechanical strength of the U-shaped mounting portion is better than that of T-beam rail disclosed in U.S. Pat. No. 6,561,578. In addition, for having the mounting means of the present invention, the bicycle saddle of the present invention can be easily mounted on any of prior art bicycle seat posts. Further, for having openings provided thereon, the mounting portion of the saddle body disclosed in the present invention can provide good ventilation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bicycle saddle comprising:
   a saddle body including a wide rear portion, a narrow front portion, a middle portion positioned between said wide rear portion and said narrow front portion;
   said saddle body further including a hollowed mounting portion extending downwardly from the underneath side of said saddle body;
   said mounting portion having a U-shaped depression including two side walls separated by a predetermined distance, a front wall, a rear wall with a rear opening, and a bottom wall with a center cut, said front wall near said narrow portion of said saddle body, said rear wall near said wide rear portion of said saddle body; and
   each of said side walls having a front side near said narrow portion of said saddle body and a rear side near said wide rear portion of said saddle body, the length of said rear side being longer than that of said front side, and
   wherein said rear side of each of said side walls has a cove to absorb the vibration as riding.

2. The bicycle saddle as claimed in claim 1, wherein said saddle body has a pair of elongate frames.

3. The bicycle saddle as claimed in claim 1, wherein each of said side walls has at least a reinforced rib.

4. The bicycle saddle as claimed in claim 1, wherein said rear wall further has an edge surrounding said first opening.

5. The bicycle saddle as claimed in claim 1, wherein said front wall has a front opening.

6. The bicycle saddle as claimed in claim 1, wherein said rear wall has an edge at an upper end thereof and an opening at an under end thereof.

7. The bicycle saddle as claimed in claim 1, wherein said middle portion is concave.

8. The bicycle saddle as claimed in claim 7, wherein said wide rear portion has a front end connected with a rear end of said middle portion, and a body portion rising gradually from the front end to a free rear end thereof so that an opening space with a sufficient depth above said concave middle portion is defined to arrange rider's genitals.

9. The bicycle saddle as claimed in claim 8, wherein said hollowed mounting portion is U-shaped in transverse cross section and extending along the center axis of said saddle body.

10. The bicycle saddle as claimed in claim 1, wherein said bottom wall has an edge surrounding said center cut.

11. The bicycle saddle as claimed in claim 1, wherein said saddle body has a ventilation channel provided on the upper side thereof and extending along a center axis thereof from a part of said narrow front portion to an end of said U-shaped depression.

12. A bicycle saddle comprising:
   a saddle body including a wide rear portion, a narrow front portion, a middle portion positioned between said wide rear portion and said narrow front portion;
   said saddle body further including a hollowed mounting portion extending downwardly from the underneath side of said saddle body;
   said mounting portion having a U-shaped depression including two side walls separated by a predetermined distance, a front wall, a rear wall with a rear opening, and a bottom wall with a center cut, said front wall near said narrow portion of said saddle body, said rear wall near said wide rear portion of said saddle body; and
   each of said side walls having a front side near said narrow portion of said saddle body and a rear side near said wide rear portion of said saddle body, the length of said rear side being longer than that of said front side,
   wherein said center cut of said bottom wall has an open side, and said rear opening of said rear wall extends downwardly to connect with said open side of said center cut of said bottom wall.

13. A bicycle saddle assembly comprising:
   a saddle body including a wide rear portion, a narrow front portion, a middle portion positioned between said wide rear portion and said narrow front portion;
   said saddle body further including a hollowed mounting portion extending downwardly from the underneath side of said saddle body;
   said mounting portion having a U-shaped depression including two side walls separated by a predetermined distance, a front wall, a rear wall with a rear opening, and a bottom wall with a center cut, said front wall near said narrow portion of said saddle body, said rear wall near said wide rear portion of said saddle body, said center cut of said bottom wall having an open side, and said rear opening in said rear wall extending downwardly to connect with said open side of said center cut of said bottom wall; and
   means for cooperating with said mounting portion of said saddle body to mount said saddle body on a bicycle seat post, said means having an upper device and an under device, said upper device being placed against an upper surface of said bottom wall of said mounting portion, said under device being placed against a lower surface of the bottom wall, whereby said bottom wall of said mounting portion is sandwiched by said upper device and said under device to mount said saddle body on a seat post.

14. The bicycle saddle assembly as claimed in claim 13, wherein said upper device has a lump-shaped body with a threaded hole, said under device has a plate-shaped body with a slot-like passage provided on the upper surface of said body and a hole piercing through said body.

15. The bicycle saddle assembly as claimed in claim 13, wherein said upper device has a lump-shaped body with at least a slot provided on the upper surface of said body and at least a hole piercing through said body, said under device has a plate-shaped body with a passage provided on the upper surface of said body and a hole piercing through said body, the mounting means further includes a fixing device with a threaded hole to be received in said slot of said upper device.

16. The bicycle saddle assembly as claimed in claim 15, wherein said lump-shaped body of said upper device has a lengthwise slot provided on the upper surface thereof, and at least a crosswise slot provided on the upper surface thereof, said fixing device is cylinder-shaped to be received in one of said slots of said upper device.

* * * * *